United States Patent
Bontly

(10) Patent No.: US 6,412,698 B2
(45) Date of Patent: Jul. 2, 2002

(54) ATTACHMENT DEVICE FOR ERGONOMICALLY SUSPENDING A HANDHELD SCANNER

(75) Inventor: Craig H. Bontly, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/912,910

(22) Filed: Jul. 25, 2001

Related U.S. Application Data

(63) Continuation of application No. 09/268,846, filed on Mar. 16, 1999, now abandoned.

(51) Int. Cl.⁷ ................................................. G06K 7/10
(52) U.S. Cl. ............................ 235/462.45; 235/472.01; 294/82.01
(58) Field of Search ..................... 285/462.45, 462.44, 285/462.43, 472.01; 294/82.1, 82.11, 82.12, 82.13

(56) References Cited

U.S. PATENT DOCUMENTS

| | | | | |
|---|---|---|---|---|
| 3,985,327 A | * | 10/1976 | Holtz | 248/318 |
| 4,645,255 A | * | 2/1987 | Zepf | 294/82.19 |
| 4,817,185 A | | 3/1989 | Yamaguchi et al. | 382/59 |
| 5,146,657 A | * | 9/1992 | Frano | 24/265 H |
| 5,274,219 A | | 12/1993 | Harden et al. | 235/462 |
| D350,127 S | | 8/1994 | Gummeson et al. | D14/116 |
| 5,368,270 A | * | 11/1994 | Wiwczar | 248/610 |
| 5,406,063 A | * | 4/1995 | Jelen | 235/471.01 |
| D359,483 S | | 6/1995 | Saunders et al. | D14/116 |
| 5,861,615 A | | 1/1999 | Bridgelall et al. | 235/462.01 |

OTHER PUBLICATIONS

I.D. News, Nov. 1997, vol. 13, No. 12, p. 78.*
www.medcovers.com/telxon/tcl3074.htm—May 1996.
www.videx.com/html/products/tp.html—May 1996.
I.D.News, title: Chicago '97, vol. 13, No. 12, p. 78—Nov. 1997.
Spectra–Physics drawing dated Jul. 9, 1992 of an overhead attachment device (hood assembly) for the SP400 scanner released in late 1992.

* cited by examiner

*Primary Examiner*—Michael G. Lee
*Assistant Examiner*—Daniel St. Cyr
(74) *Attorney, Agent, or Firm*—Lyon & Lyon LLP

(57) ABSTRACT

A handheld data reader includes a head portion and an attachment device mounted to the head portion for suspending the scanner from an overhead retractor or the like such that the scanner is oriented substantially vertically with its handle directed substantially downward. The attachment device includes an arcuate member that may be configured to pivot away from the head portion. The attachment device may be recessed in the head portion such that the arcuate member is substantially coplanar with the adjacent outer surfaces of the head portion.

26 Claims, 2 Drawing Sheets

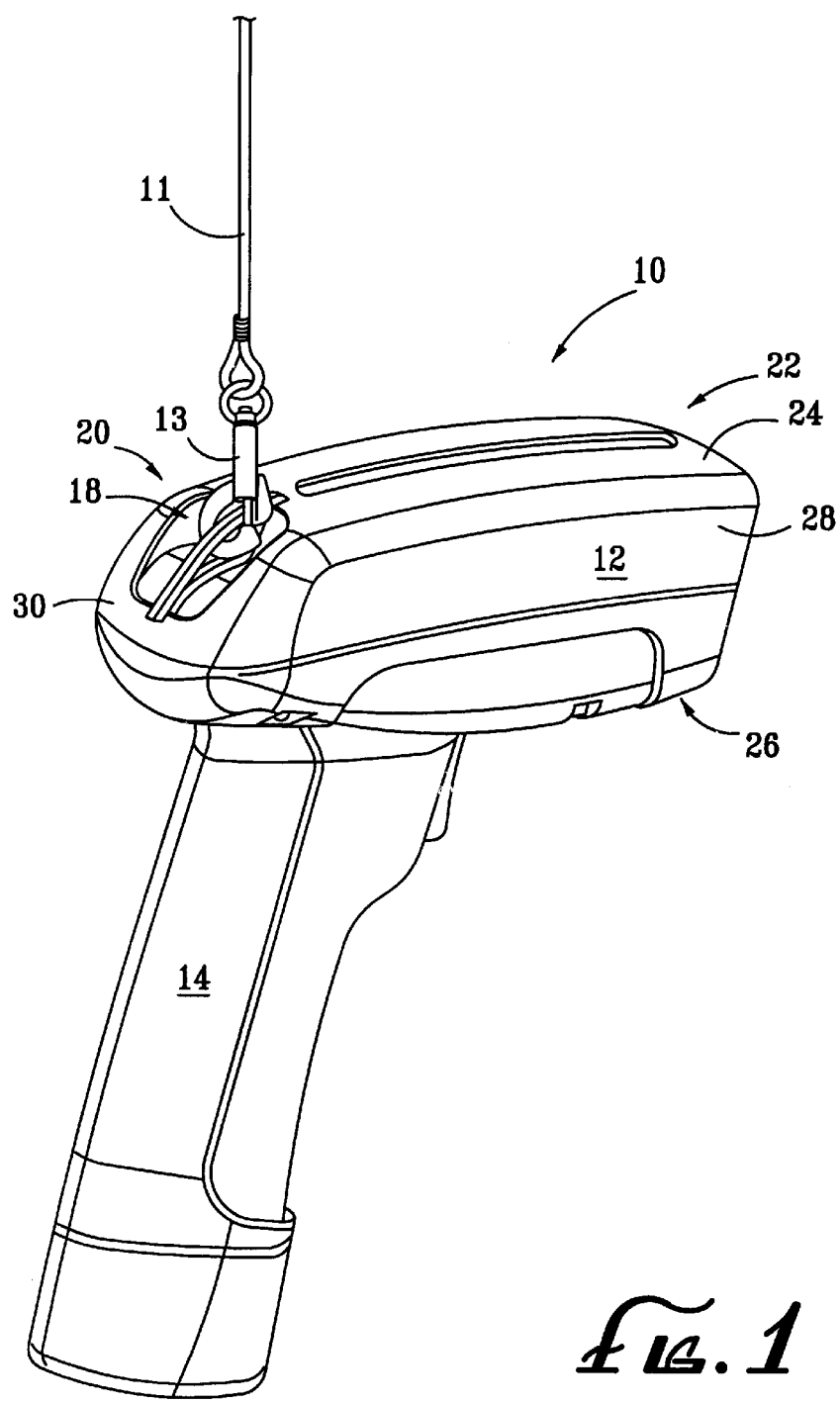
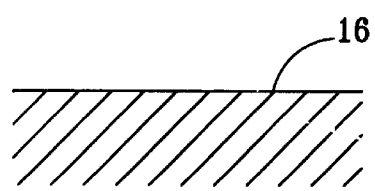

ATTACHMENT DEVICE FOR ERGONOMICALLY SUSPENDING A HANDHELD SCANNER

CROSS-REFERENCE TO RELATED APPLICATION

This application is a continuation application of U.S. application Ser. No. 09/268,846 filed Mar. 16, 1999 now abandoned.

BACKGROUND

The field of the present invention relates to optical systems for data reading and particularly to handheld scanners.

Ideal for inventory management, material handling, manufacturing and especially package sortation and transportation, data reading devices are indispensable tools for commercial and industrial environments as well as the front office. Whether stationary, handheld, or combination stationary/handheld, data reading devices are useful for reading a wide array of indicia found on consumer and industrial products, such as traditional linear or one-dimensional bar codes, two-dimensional symbologies, matrix array symbols, patterns and logos, signatures, and other images.

Due to such efficiency and accuracy of data input, data readers, especially handheld scanners, have become an integral part of an employee or user's everyday work routine. Standing at a check-out line, for example, a clerk may lift, rotate, and otherwise manipulate a handheld scanner dozens of times. Because frequent and repetitive motions can cause a user to suffer from a Repetitive Stress Injury (RSI) or a Cumulative Trauma Disorder (CTD), or other physical maladies, it is desirable to minimize the need to manipulate the scanner and/or object scanned and otherwise make any required manipulations as efficient as possible.

Traditional suspended handheld scanners have an attachment point located on the end of the handle. Typically, an overhead retractor that includes a retractable hanging cable or tether, which includes a key-ring style clip at one end thereof, is linked to the attachment point on the handle. When left free to hang from the overhead retractor, the traditional suspended handheld scanner is inverted from its vertical, or right-side-up orientation. Each time the user operates the suspended scanner, the user must first rotate the device to its vertical orientation.

Thus, the present inventor has recognized the desirability of an ergonomic scanner design that minimizes the motion necessary to use a suspended handheld scanner.

SUMMARY OF THE INVENTION

Having recognized these conditions, the present invention is preferably directed to a handheld scanner having a head portion and an attachment device mounted to the head portion for suspending the scanner from an overhead retractor or the like. In this manner, the scanner is oriented substantially vertically or upright such that when grasped, the user does not have to rotate the scanner before using same. In one type of handheld reader (the "gun-shaped" type) with a head portion and a handle portion attached to the bottom of the head, when suspended via an attachment device located on the head portion, the handle portion is directed substantially downward such that the user does not have to rotate the handle of the scanner before using same.

The attachment device preferably includes an arcuate member for coupling with a coupler, such as a key-ring style coupler, associated with one end of a tether or cable of an overhead retractor. The arcuate member may be configured to pivot away from the head portion for receiving a solid-ring style coupler or the like. Moreover, the attachment device may be recessed in the head portion such that the arcuate member is substantially coplanar with the adjacent outer surfaces of the head portion. Other and further objects and advantages will appear hereinafter.

BRIEF DESCRIPTION OF THE DRAWINGS

FIG. 1 is a perspective view of a handheld scanner including an attachment device according to a first preferred embodiment;

DETAILED DESCRIPTION OF PREFERRED EMBODIMENTS

Figure 2:
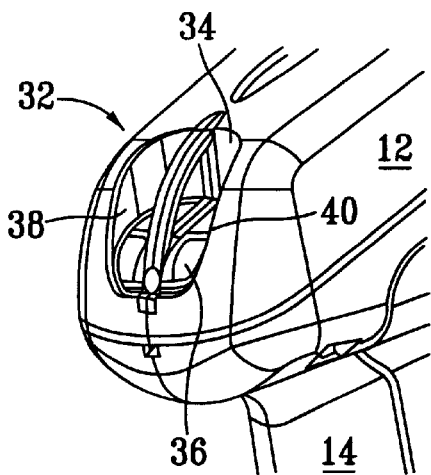
FIG. 2 is a perspective, detailed view of the rear end of the handheld scanner shown in FIG. 1.

Preferred embodiments will now be described with reference to the drawings. For clarity of description, any element numeral in one figure will represent the same element if used in any other figure.

FIG. 1 illustrates an example of a data reading device such as a bar code reader 10 configured as a handheld gun-shaped device constructed of a lightweight plastic housing having a head portion 12 and pistol-grip type handle portion 14. Mounted inside the head portion 12 is a removable scan module or assembly (not shown) that contains a light source, a detector, and the optics and signal processing circuitry.

In a common system, the light source, such as a gas laser diode or semiconductor laser diode, generates a coherent light beam which is repetitively scanned by a scanning mechanism and thereby swept across the target indicia, such as a bar code symbol. The detector senses light reflected or scattered from the code to detect the bars and spaces of the code symbols and thereby derive the encoded data. A variety of such moving-beam laser scanners and their scanning mechanisms are known as described in, for example, U.S. Pat. Nos. 5,475,206 and 5,629,510 or U.S. application Ser. No. 08/934,487, each of these disclosures hereby incorporated by reference.

As an alternative to the laser-based scanner system, a non-coherent light source, such as a light emitting diode (LED), may be used to flood the target indicia with light. Solid state imaging arrays, such as a one-dimensional imaging sensor (1D CCD or CMOS sensor) or a two-dimensional imaging sensor (2D CCD or CMOS sensor), detect the reflected or scattered light and determine the presence of a bar or a space and thereby derive the encoded data. Thus as used herein, a handheld scanner is any type of handheld data reading device.

The present invention is particularly adapted for use with a portable data reader such as handheld scanner 10 that is suspended above a ground surface 16 when not being used by an employee or operator. The scanner 10 may be suspended via an overhead retractor (not shown) that includes a retractable hanging tether 11. As referred to herein, a "tether" is a cable, rope, or chain that typically includes a key-ring style clip 13 at one of its ends for clipping onto the attachment point of a scanner and thereby suspend same. Instead of a key-ring style clip 13, the tether 11 may alternatively include a solid-ring style coupler for coupling with a scanner 10.

Advantageously, the present invention permits the scanner 10 to be suspended above the ground surface 16 and hang via gravity in a ready-to-use or right-side-up orientation. In other words, once a scanner 10 including the present invention is coupled to a tether 11 and left free to hang in the air, gravitational forces will act against the mass of the scanner 10 to the advantage of the user. Thus, due to gravity, the freely suspended scanner 10 including the present invention will be substantially "vertical" such that its handle portion 14 is directed substantially downward (toward the ground surface 16). Accordingly, in contrast to current handheld scanners, a person using the present invention will not have to make the frequent and repetitive motion of rotating the device 10 to its vertical orientation every time the user desires to operate the data reader 10.

To achieve this ergonomic benefit, an attachment device 18 according to one aspect of the present invention is located on the head portion 12 of the scanner 10. The attachment device 18 may be disposed about any region of the head portion 12 as long as the scanner 10, when freely suspended, has its handle 14 directed substantially downward. For example, assuming the mass of the head portion 12 is greater than the mass of the handle portion 14 and the attachment point 18 is located on the head portion 12, gravity would have a greater effect on the head 14 rather than the handle 12 such that the scanner 10 would be suspended in the desired vertical orientation.

The attachment device 18 is preferably located about the rear end 20 of the head portion 12 opposite the front end 22 thereof. This preferred location is due to the scanner's weight distribution relative to the attachment point 18. As the mass of the head portion 12 is typically greater than the mass of the handle portion 14 and the handle portion 14 is attached to the bottom of the head portion 12, an attachment point 18 located on the rear end 20 enables the unit 10 to hang in the air in the most ergonomically desirable orientation.

The rear end 20 is defined by a top wall 24, bottom wall 26, opposing side walls 28, and adjoining end wall 30. As shown in FIG. 1, the attachment device 18 is centrally disposed about the upper, rear end 20 of the head 12 near where the top wall 24 joins the end wall 30. This attachment point is substantially opposite the junction of the handle portion 14 and the head portion 12. The present inventor has found this location ideal for maintaining the handle 14 in a substantially downward direction when the scanner 10 is suspended via a tether 11.

FIGS. 1 and 2 illustrate that the attachment device 18 may be recessed in the rear end 20 of the head portion 12 of the scanner 10. The recess, defined by an inner front wall 34, an inner bottom wall 36, and two opposing side walls 38, includes a channel 40. The channel 40 is formed in the inner front wall 34 and inner bottom wall 36 and is configured to receive a portion of the attachment device 18. In particular, the channel 40 is configured to frictionally engage the first and second arms 42, 44 of an L-shaped member 46 of the attachment device 18.

Figure 3:
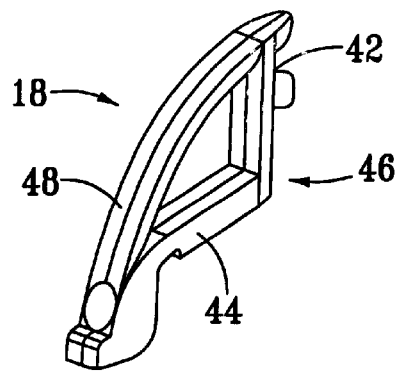
FIG. 3 is a perspective, detailed view of the attachment device shown in FIG. 1.

Referring to FIG. 3, the attachment device 18 includes a first arm orthogonally joined to a second arm to define an L-shaped member. A generally convexly arcuate member 48 joins the respective free ends of the L-shaped member 46.

The attachment device 18 is dimensioned such that the arcuate member 48, when the attachment device 18 is seated in the channel 40 of the recess 32, is substantially coplanar with the adjacent walls 24, 30 of the scanner 10.

Although the attachment device 18 illustrated in FIGS. 1–3 is shown as a separate, removable unit, the attachment device 18 may be integral with or permanently fixed to the head portion 12. For example, the attachment device 18 and the head portion 12 may be formed during a single molding process, such as injection molding or the like, commonly known to those of skill in the art.

Figure 4:
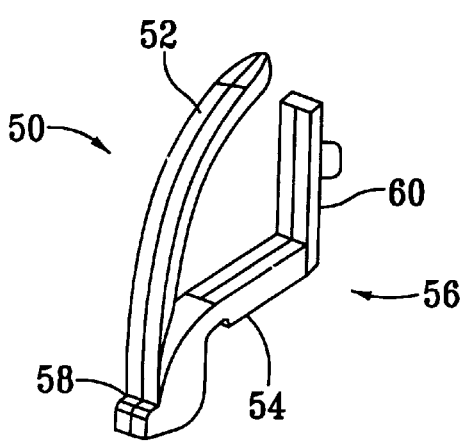
FIG. 4 is a perspective view of an attachment device according to a second preferred embodiment.

FIG. 4 illustrates an alternate embodiment wherein the attachment device 50 may be configured to pivot away from the head portion 12 of the scanner 10. Referring to FIG. 4, an arcuate member 52 is connected to an arm 54 of an L-shaped member 56 via a living hinge 58. Other means of pivoting the arcuate member 52, such as via a standard hinge, key-ring style clip, or the like commonly known to those skilled in the art, may also be employed. Moreover, the arcuate member 52 may be adapted to pivot away from the second arm 60 of the L-shaped member 56, rather than the first arm 54 of the L-shaped member 56. Advantageously, such a pivoting arrangement enables the attachment device 50 to open and receive a greater array of couplers associated with the tether 11. For example, the attachment device 50 can receive a solid-ring style coupler, as well as a key-ring style clip 13. Once received, the arcuate member 52 may be closed and held in place against the head portion 12 or the L-shaped member 56 via a detent mechanism, a fastener, a key-ring style clip element, or the like commonly known to those skilled in the art.

Figure 5:
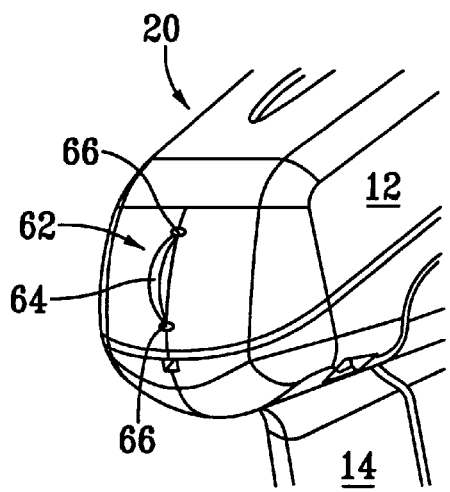
FIG. 5 is a perspective, detailed view of the rear end of a handheld scanner including an attachment device according to a third preferred embodiment.

FIG. 5 illustrates an alternate embodiment of an attachment device 62 that is not seated in a recess, such as recess 32 shown in FIGS. 1 and 2. Referring to FIG. 5, this coupler 62 includes an arcuate member 64 that is fastened against the head portion 12 of the scanner 10. As was the case with the embodiments shown in FIGS. 1–4, the attachment device 62 is preferably located about the rear end 20 of the head portion 12. The attachment device 62 may be fastened at one or both of its ends via fasteners 66, such as detents, bands, or any other means commonly known in the art.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A portable data reader comprising:
   a head portion;
   a handle portion linked to the handle portion;
   an attachment means seated in the recess for coupling the data reader to a tether used to suspend the data reader above a ground surface, wherein the attachment means the head portion such that, when suspended from the attachment means, the data reader is oriented in a substantially upright position wherein the handle portion is directed substantially downward toward the ground surface.

2. A data reader according to claim 1 wherein the data reader is substantially gun-shaped, the head portion having a front end and a rear end, the attachment means being mounted to the rear end.

3. A data reader according to claim 1 wherein the attachment means includes an arcuate member.

4. A data reader according to claim 3 wherein the arcuate member is adapted to pivot into an open position for receiving a coupling.

5. A data reader according to claim 1 wherein the head portion includes a rear end and a front end, the recess being formed in the rear end for receiving a portion of the attachment means.

6. A data reader according to claim 1 wherein the attachment means includes a first arm and a second arm interconnected via an arcuate member.

7. A data reader according to claim 6 wherein the attachment means is seated in the head portion such that the arcuate member is substantially coplanar with the adjacent outer surfaces of the head portion.

8. A data reader according to claim 7 wherein the first arm and the second arm of the attachment means are integral to the head portion.

9. A data reader according to claim 1 wherein the attachment means includes a substantially L-shaped member and an arcuate member pivotally joined to the L-shaped member.

10. A data reader according to claim 9 wherein the L-shaped member is integral to the head portion.

11. A data reader according to claim 1 wherein the attachment means is molded to the head portion.

12. A handheld scanner comprising:
a housing including a head portion and a handle portion joined substantially orthogonal thereto;
a recess molded in the head portion substantially opposite the junction of the head portion and the handle portion;
a coupler having a portion thereof seated in the recess, wherein the coupler is constructed and arranged to be flush with a top surface of the head portion, the coupler for coupling to a tether.

13. A scanner according to claim 12 wherein the recess is defined by an inner front wall, an inner bottom wall, and opposing side walls, the inner front and bottom walls having a channel for receiving the attachment device.

14. A scanner according to claim 13 wherein the attachment means includes a substantially L-shaped member and an arcuate member, the L-shaped member configured to frictionally engage the channel.

15. A scanner according to claim 14 wherein the arcuate member is pivotally joined to the L-shaped member.

16. A scanner according to claim 12 wherein the attachment means includes a substantially L-shaped member integral with the head portion and an arcuate member integral with the L-shaped member.

17. A scanner according to claim 16 wherein the arcuate member is configured to be substantially coplanar with the adjacent outer surfaces of the head portion.

18. A scanner according to claim 12 wherein the arcuate member is adapted to pivot away from the recess for receiving a solid-ring coupler associated with one end of the tether.

19. A data reader comprising:
a housing including a handle and a head,
wherein the handle has a top portion and a bottom portion,
wherein the head has a rear end and a front end, the rear end being defined by an end wall joining a top wall, a bottom wall, and opposing side walls, and wherein the head has a recess molded therein;
a coupler for coupling the data reader to a tether used to suspend the data reader above a ground surface, the coupler seated in the recess and constructed and arranged to be flush with the top wall such that the bottom portion of the handle is directed substantially downward toward the ground surface when the data reader is suspended.

20. A data reader according to claim 19 wherein the recess is centrally formed within the rear end at about the junction of the top wall and the end wall, the coupler having a generally convexly arcuate member that is substantially coplanar with the adjacent outer surfaces of the head when the coupler is seated in the recess.

21. A data reader according to claim 20 wherein the coupler includes a substantially L-shaped shaped member integral with the arcuate member.

22. A data reader system, comprising:
a reader housing including a handle section attached to a head section, having a recess molded in a top portion thereof;
a tether; and
a coupler disposed in the recess and constructed and arranged to be flush with a top surface of the head section and adapted to be coupleable to the tether.

23. A data reader system according to claim 22 wherein the handle section is suspended generally vertically when the reader housing is suspended via the tether.

24. A data reader system according to claim 22 wherein the coupler is integrally molded with the head section.

25. A data reader system according to claim 22 wherein the tether is adapted to suspend the reader housing via the coupler.

26. A data reader system according to claim 22 wherein the coupler comprises an arcuate member and the tether comprises a clip which is removably coupleable to the arcuate member.

* * * * *

UNITED STATES PATENT AND TRADEMARK OFFICE
CERTIFICATE OF CORRECTION

PATENT NO. : 6,412,698 B2  Page 1 of 1
DATED : July 2, 2002
INVENTOR(S) : Craig H. Bontly It is certified that error appears in the above-identified patent and that said Letters Patent is hereby corrected as shown below:

Column 4,
Line 49, after "a head portion" insert -- having a recess molded therein --;
Line 49, delete "to the handle" and insert -- to the head --;
Line 53, after "wherein the attachment means" insert -- is constructed and arranged to be flush with a top surface of --.

Column 6,
Line 25, change "L-shaped shaped member" to -- L-shaped member --.
Line 29, before "having a recess" insert -- the head section --.

Signed and Sealed this

Seventh Day of June, 2005

JON W. DUDAS
*Director of the United States Patent and Trademark Office*